US008589046B2

(12) United States Patent
Pothin et al.

(10) Patent No.: US 8,589,046 B2
(45) Date of Patent: Nov. 19, 2013

(54) METHOD OF RELEASING THE BRAKES OF A MOTOR VEHICLE FITTED WITH AN ASSISTANCE DEVICE FOR STARTING ON A SLOPE, SUCH AN ASSISTANCE DEVICE, AND MOTOR VEHICLE COMPRISING IT

(75) Inventors: Richard Pothin, Jouars-Ponchartrain (FR); Alessandro De-Rinaldis, Paris (FR); Olivier Cayol, Versailles (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 246 days.

(21) Appl. No.: 13/057,697

(22) PCT Filed: Jul. 3, 2009

(86) PCT No.: PCT/FR2009/051297
§ 371 (c)(1),
(2), (4) Date: May 2, 2011

(87) PCT Pub. No.: WO2010/015762
PCT Pub. Date: Feb. 11, 2010

(65) Prior Publication Data
US 2011/0202249 A1 Aug. 18, 2011

(30) Foreign Application Priority Data
Aug. 7, 2008 (FR) ...................................... 08 55476

(51) Int. Cl.
*G06F 19/00* (2011.01)
(52) U.S. Cl.
USPC .............................. 701/70; 303/192; 303/198
(58) Field of Classification Search
USPC .............. 701/70; 184/244; 303/191, 192, 198
See application file for complete search history.

(56) References Cited

U.S. PATENT DOCUMENTS

| 4,717,207 | A | * | 1/1988 | Kubota et al. ...................... 303/3 |
| 5,911,646 | A | * | 6/1999 | Tsutsui et al. .................. 477/93 |
| 6,260,934 | B1 | * | 7/2001 | Lee ................................ 303/192 |
| 2004/0070272 | A1 | * | 4/2004 | Grupp et al. ................... 303/198 |
| 2005/0010356 | A1 | * | 1/2005 | Ishiguro et al. ............... 701/124 |
| 2006/0079377 | A1 | * | 4/2006 | Steen et al. .................... 477/186 |
| 2007/0038357 | A1 | * | 2/2007 | Leminoux et al. .............. 701/75 |
| 2008/0051968 | A1 | * | 2/2008 | Belen et al. ..................... 701/74 |

FOREIGN PATENT DOCUMENTS

| EP | 0781946 | 7/1997 |
| FR | 2713573 | 6/1995 |
| FR | 2915159 | 10/2008 |
| WO | 2004 058551 | 7/2004 |

OTHER PUBLICATIONS

International Search Report issued Jan. 7, 2010 in PCT/FR09/051297 filed Jul. 3, 2009.

* cited by examiner

*Primary Examiner* — Khoi Tran
*Assistant Examiner* — Adam Mott
(74) *Attorney, Agent, or Firm* — Oblon, Spivak, McClelland, Maier & Neustadt, L.L.P.

(57) ABSTRACT

A method of releasing brakes of a motor vehicle including: if no vehicle start command takes place, after manual application of the vehicle brakes in a position to immobilize the vehicle when at rest is over, an assistance device progressively releases the brakes according to a suitable control scheme configured to make the vehicle move under its own weight, generally tending towards predetermined non-zero speed and acceleration conditions, and then, when the predetermined conditions are considered to have been reached, the assistance device stops releasing the brakes.

13 Claims, 3 Drawing Sheets

METHOD OF RELEASING THE BRAKES OF A MOTOR VEHICLE FITTED WITH AN ASSISTANCE DEVICE FOR STARTING ON A SLOPE, SUCH AN ASSISTANCE DEVICE, AND MOTOR VEHICLE COMPRISING IT

TECHNICAL FIELD

The present invention relates to a method of releasing the brakes of a motor vehicle equipped with a hill start assist device. It also relates to such an assist device and to a motor vehicle comprising it.

When a motor vehicle is at a standstill on a hill, it is often difficult, or even sometimes dangerous, to start this vehicle in the uphill direction. For a great many drivers, hill starts in the uphill direction are therefore a source of great stress.

In a hill start, the driver has as far as possible to prevent his vehicle from rolling back, without stalling the engine that powers this vehicle and, in order to do this, he has to combine two actions which are releasing the brakes and gradually coupling the driving wheels of the vehicle to the engine that powers this vehicle.

Command and control devices generally known as "hill start assist", "hill hold assist" and "hill launch assist" devices have been developed with a view to making the task of the driver easier in a hill start by managing this start in his stead when this driver depresses the accelerator pedal having stopped manually keeping the brakes of the vehicle in their braked position.

PRIOR ART

A hill start assist device like the one mentioned hereinabove is described in French Patent Application FR-2 736 027. After the driver has stopped manually keeping the brakes of the vehicle in their brakes-applied position, this device takes over from the driver and in its turn keeps the brakes applied until a command to start the vehicle is received. If the driver then leaves the driving seat of the vehicle without having previously operated the hand brake or parking brake, an alarm is set off on the basis of information from a detector detecting the presence of the driver in the driving seat and of information from a pressure sensor, to alert the occupant or occupants of the vehicle. If this alarm is not heard or does not go off, or alternatively if it is disregarded, the parking brake is not actuated even though keeping the brakes applied by a pressurized liquid in a hydraulic circuit transmitting a braking command is not considered capable of restraining and immobilizing a parked vehicle with a sufficient degree of safety.

Another hill start assist device is described in document WO 2004/058551. After the driver has stopped manually keeping the brakes of the vehicle in their brakes-applied position, this hill start assist device keeps the brakes applied until a command to start the vehicle is received. In the absence of such a command, the hill start assist device releases the brakes when a predetermined timed period has elapsed. After that, the vehicle is carried along under its own weight, if the handbrake or parking brake has not been applied beforehand and if the vehicle is on a slope. In such instances, this results in a not insignificant risk of an accident, particularly if the driver is no longer correctly seated in the driving seat of the vehicle when the timed period of predetermined duration expires.

DESCRIPTION OF THE INVENTION

The object of the invention is at least to improve safety associated with the use of a motor vehicle equipped with a hill start assist device.

According to the invention, this object is achieved by virtue of a method of releasing the brakes of a motor vehicle equipped with a hill start assist device, characterized in that it comprises steps in which:

b) if no command to start the vehicle occurs after a manual keeping of the brakes of the vehicle in a position that immobilizes this vehicle at a standstill ends, the assist device releases the brakes progressively according to a control designed to cause the vehicle to start to move under its own weight generally tending toward predetermined non-zero speed and acceleration conditions, then c) when said predetermined conditions are considered to have been reached, the assist device stops releasing the brakes.

Whether this be in the direction of rolling back or in the opposite direction, the fact that the vehicle starts to move under its own weight alerts, particularly the driver, to the fact that the parking brake has not been applied or has not been applied to a sufficient extent. The driver can then immediately react by applying this parking brake while the speed and the acceleration of the vehicle are still low, so that the risk of a collision between this vehicle and an obstacle remains very small.

Advantageously, the method comprises a step which begins as soon as said manual keeping of the brakes in the position that immobilizes the vehicle ends and in which:

a) during a predetermined timed period on expiry of which step b) begins, the assist device automatically keeps the brakes of the vehicle in said position that immobilizes this vehicle if no command to start the vehicle has occurred.

Advantageously, in step b), the assist device performs said control using, as the mass of the vehicle, a predetermined mass and makes an estimate of the actual mass of the vehicle on the basis of a difference in time between when the vehicle actually starts and when the vehicle was estimated to start to move under the action of its own weight, then the assist device performs said control using, as the mass of the vehicle, said estimate of the actual mass of the vehicle, said estimated start of movement of the motor vehicle being calculated on the basis of said predetermined mass.

Advantageously, the application of the brakes results from the application of a braking pressure, and in that step b) comprises at least one sequence in which:

b2) the pressure with which the brakes are applied is dropped substantially linearly as a function of time, at a rate of decrease substantially equal to $k_{s1}$ defined as forming part of the solution to a system of two simultaneous equations with two unknowns, which system is as follows:

$$\begin{cases} a_{cons} = \dfrac{k_{s1} \times k_\mu \times D_1}{M_1 \times R} \\ V_{cons} = \dfrac{1}{2} \times \dfrac{k_{s1} \times k_\mu \times D_1^2}{M_1 \times R} \end{cases},$$

where $a_{cons}$, $V_{cons}$, $k_\mu$, $M_1$ and R are, respectively, an acceleration set as one of the predetermined conditions, a speed set as one of the predetermined conditions, a brake effectiveness coefficient, a mass of the motor vehicle, and the mean radius of the wheels of the vehicle, while $k_{s1}$ is one of the unknowns and $D_1$ is the other, namely the time taken for said predetermined conditions to be reached measured from the start of the sequence b2).

Advantageously, in sequence b2), use is made, as the mass $M_1$ of the vehicle, of said predetermined mass, step b) comprising a sequence which follows the sequence b2) and in which:

b3) the pressure with which the brakes are applied is dropped substantially linearly as a function of time, at a rate of decrease substantially equal to $k_{s2}$ defined as forming part of the solution to a system of two simultaneous equations with two unknowns, which system is as follows:

$$\begin{cases} a_{cons} = \dfrac{\Delta M}{M_1} \times g \times \sin(\alpha) + \dfrac{k_{s2} \times k_\mu \times D_2}{M_1 \times R} \\ V_{cons} = \dfrac{\Delta M}{M_1} \times g \times \sin(\alpha) \times D_2 + \dfrac{1}{2} \times \dfrac{k_{s2} \times k_\mu \times D_2^2}{M_1 \times R} \end{cases},$$

where g, $\alpha$, $M_2$ and $\Delta M$ are, respectively, the acceleration due to gravity, an estimate of the angle of inclination of the anterioposterior axis of the motor vehicle with respect to the horizontal, said estimate of the actual mass of the vehicle and the difference between the predetermined mass $M_1$ and this estimate $M_2$ using the equation $\Delta M = M_1 - M_2$, while $k_{s2}$ is one of the unknowns and $D_2$ is the other, namely the time taken to reach said predetermined conditions measured from the start of sequence b3).

Advantageously, in step b), the assist device makes the estimate $M_2$ of the actual mass of the vehicle using an equation which is as follows:

$$M_2 = M_1 - \dfrac{k_{s1} \times k_\mu \times \Delta t}{g \times \sin(\alpha) \times R},$$

where $\Delta t$ is the difference in time between the actual and estimated times that the vehicle starts to move under the action of its own weight.

Advantageously, step b) comprises a sequence that the sequence b2) follows and in which:

b1) the assist device releases the brakes at a predetermined rate.

Advantageously, before the sequence b2), the assist device evaluates a minimum braking pressure below which the pressure with which the brakes are applied is insufficient for these brakes to succeed in keeping the vehicle immobilized against the weight of this vehicle. The assist device switches from sequence b1) to sequence b2) when the pressure with which the brakes are applied reaches a threshold evaluated on the basis of said minimum braking pressure.

Advantageously, the assist device regularly checks at least one item of information relating to detection of a possible command to start the vehicle, throughout the brake release method, and prematurely interrupts this method if such a command to start the vehicle is detected.

Another subject of the invention is a hill start assist device for a motor vehicle, characterized in that it is designed to perform progressive release of the brakes of the motor vehicle if no command to start the vehicle occurs after manual keeping of the brakes of the vehicle in a position that immobilizes this vehicle at a standstill ends, this progressive release of the brakes taking place according to a control law designed to cause the vehicle to start to move under its own weight tending substantially toward predetermined non-zero speed and acceleration conditions, the assist device being designed to halt the release of the brakes when said predetermined conditions are considered to have been reached.

Advantageously, this hill start assist device is designed to implement a method as defined hereinabove.

A further subject of the invention is a motor vehicle which comprises an assist device as defined hereinabove.

BRIEF DESCRIPTION OF THE FIGURES

The invention will be clearly understood from reading the description which will follow, given solely by way of example and made with reference to the attached drawings in which.

ONE EMBODIMENT OF THE INVENTION

Figure 1:
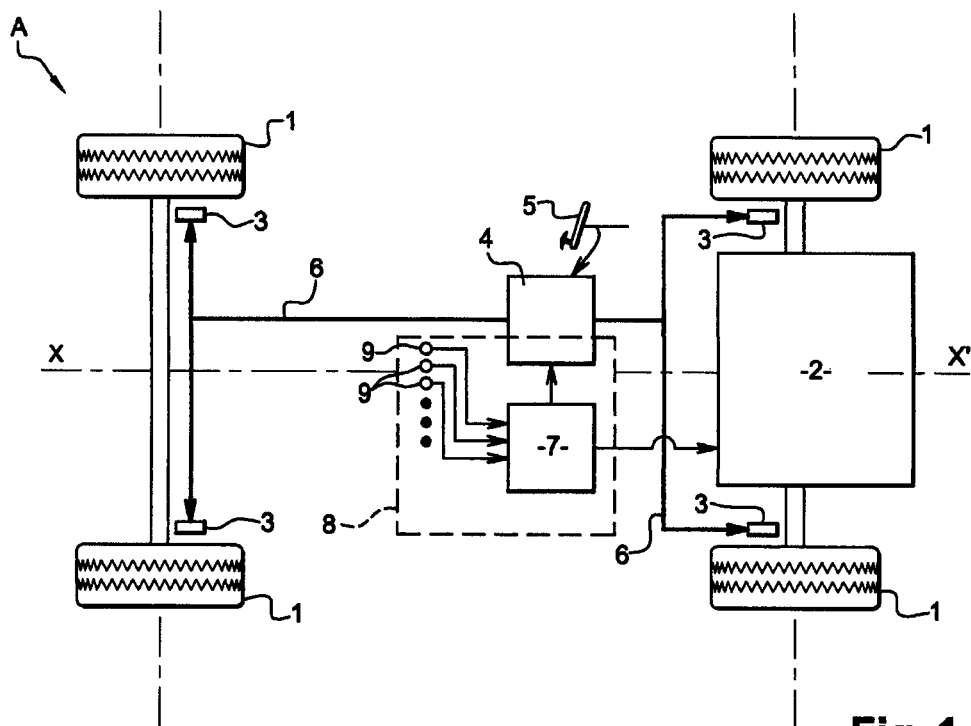
FIG. 1 is a simplified diagram of a braking installation fitted to a motor vehicle according to the invention.

In FIG. 1, a motor vehicle A is symbolized by its four wheels 1 and by its drive system 2 which is coupled to a number of these wheels 1 and which conventionally comprises an engine or motor, such as a combustion engine or an electric motor or alternatively a hybrid power plant, a clutch and a gearbox.

In what follows and in the accompanying claims, the terms "front", "rear", "anterioposterior" and similar terms refer to the normal direction of travel of the motor vehicle A.

Each wheel 1 is associated with a brake 3 that forms a component part of a braking installation that further comprises a system 4 for transmitting commands to the brakes 3. This system 4 is known per se and for the purposes of clarity its component parts have not been depicted. These component parts may notably include a hydraulic fluid reservoir, a master cylinder or some other device for generating or metering hydraulic pressure under the command of a brake pedal 5. As is known per se, the system 4 for transmitting commands may also comprise a high-pressure pump, a hydraulic pressure accumulator connected to this pump, and an electrically operated switching valve connected in such a way as to be able to place the pressure accumulator or the master cylinder in communication with all or some of the brakes 3. A number of constituent parts of this system 4 are connected to one another and/or to the brakes 3 by a hydraulic circuit, a number of branches of which have been schematically depicted and referenced 6 in FIG. 1.

Still in this FIG. 1, the reference 7 denotes an electronic command and control unit or computer, which forms part of a hill start assist device 8 and which is able to command the drive system 2, and the electrically operated switching valve of the system 4 in such a way as to manage a starting of the vehicle A in place of the driver of this vehicle. This electronic unit 7 is connected to a number of sensors 9 which include notably at least one sensor or estimator of the pressure with which the brakes 3 are applied and a sensor, the purpose of which is to detect a forward or backward movement of the vehicle A. The latter sensor may, for example, be a speed sensor or an acceleration sensor.

Figure 2:
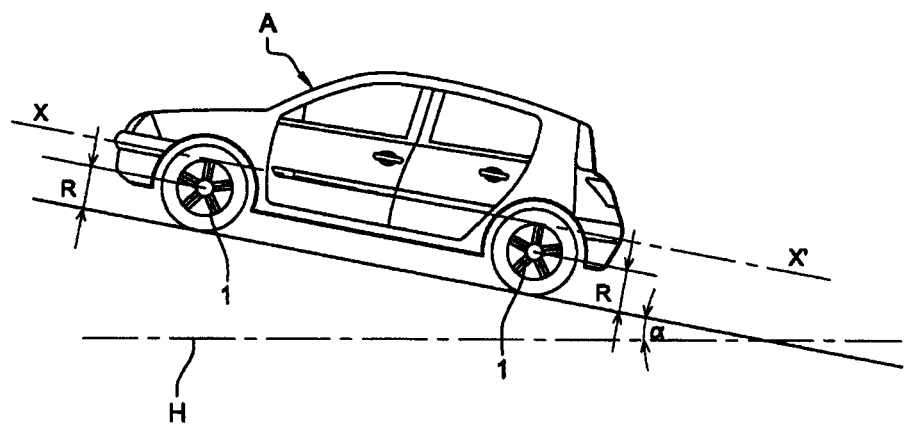
FIG. 2 is a schematic side view in which the motor vehicle equipped with the braking installation of FIG. 1 is at a standstill on a slope.

Another sensor 9 has the function of measuring an angle referenced $\alpha$ in FIG. 2, when the vehicle A is at a standstill on a slope. This angle $\alpha$ is, more specifically, the angle of inclination of the anterioposterior axis X-X' of the vehicle A with respect to the horizontal H.

Figure 3:
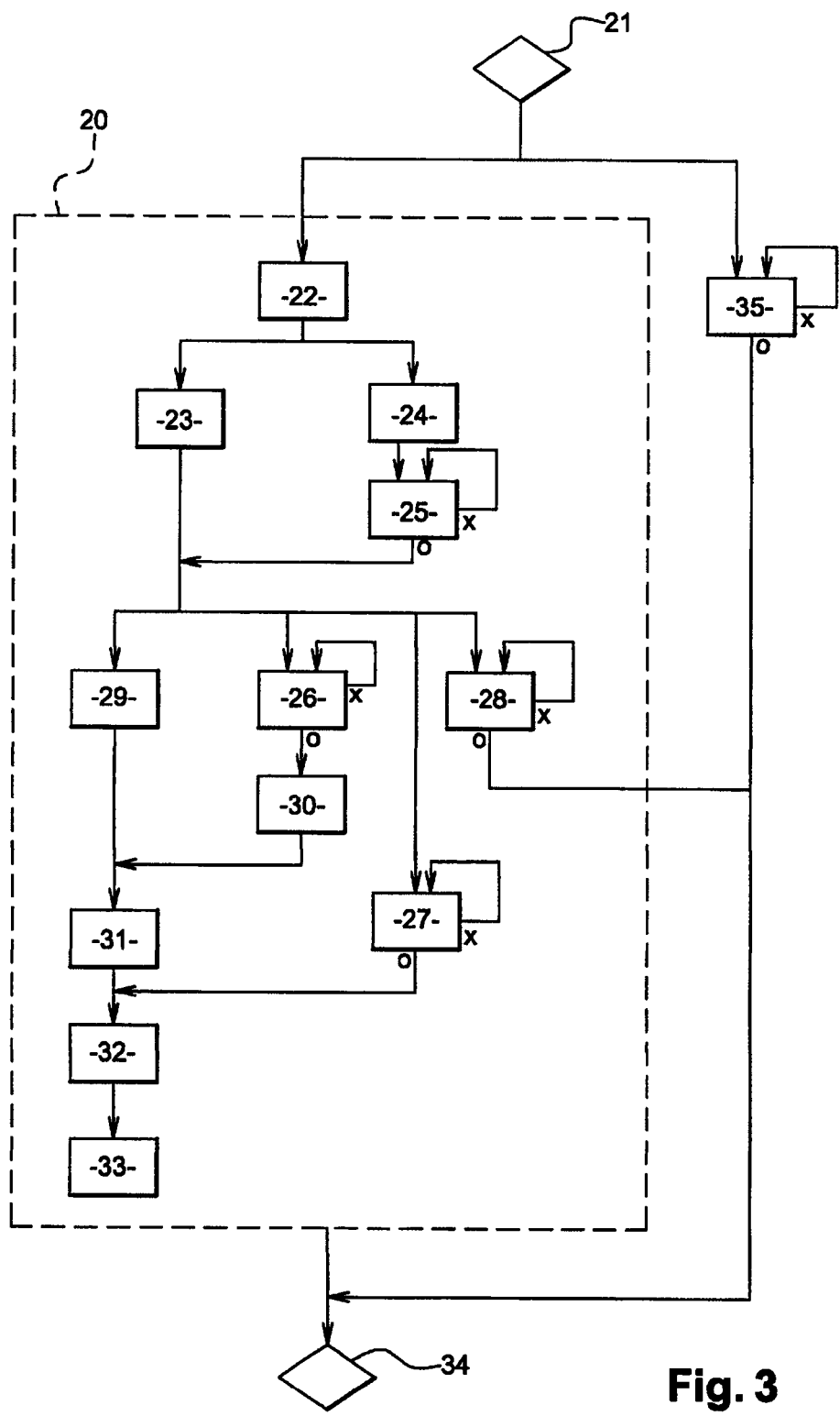
FIG. 3 is a block diagram of the logic on which a method according to the invention is run and which more particularly is a method of releasing the brakes of the vehicle of FIG. 2.

The electronic unit 7 is as able to manage a starting of the vehicle A in place of the driver, in a way known per se, as it is to run the method 20 whose logic is illustrated in the flow diagram of FIG. 3. This method 20 is a method of releasing the brakes 3. It is started by the end 21 of an action by the driver on the brake pedal 5 while the vehicle A is at a standstill.

As soon as the driver stops depressing this brake pedal 5, the electronic unit 7, commands the keeping of the brakes applied 22 during a first period of time, advantageously ranging between one second and ten seconds. After this first time period has expired, the assist device 8 enters a sequence 23 of the method 20, by starting to perform a first progressive and controlled release of the brakes 3. This first release begins at an instant denoted $t_0$ in FIG. 4. It consists in a reduction in the pressure P with which the brakes 3 are applied. This pressure P is the mean pressure applied at the brakes 3, between the brake pads and the rotary disks against which these pads press and which are secured firmly to the wheels 1. In other words, it is a brake application force divided by the area over which this force is applied and which is the area of contact between a brake pad and a rotary disk secured to a wheel 1.

At the same time as the first release of the brakes 3 is occurring, an estimate 24 is made in which, using a measurement from the sensor 9 that evaluates the inclination of the vehicle A, the electronic unit 7 estimates the value below which the pressure with which the brakes 3 are applied is no longer sufficient to prevent the vehicle A from moving along under its own weight. In what follows, this value is known as the minimum braking pressure $P_{min}$. It is estimated using the following relationship:

$$P_{min} = \frac{M_1 \times g \times \sin(\alpha) \times R}{k_\mu}, \qquad (1)$$

where $M_1$ is a predetermined mass, set as being the maximum mass that the motor vehicle A can achieve, and where g, R and $k_\mu$ are, respectively, the acceleration due to gravity, the mean radius of the wheels of the vehicle A and a coefficient of effectiveness of the brakes 3. This coefficient $k_\mu$ is dependent on the types of brakes 3 and, more generally, on details of the braking installation which comprises these brakes 3.

On the basis of the minimum braking pressure $P_{min}$, the electronic unit 7 calculates a threshold pressure $P_1$ as follows: $P_1 = k_r \times P_{min}$ where $k_r$ is a factor of safety greater than or equal to 1.

When the threshold pressure $P_1$ has been calculated, the electronic unit 7 compares it against the actual braking pressure, in the test 25. As long as this actual braking pressure is higher than the threshold pressure $P_1$, the test 25 is regularly reiterated, while the first controlled release of sequence 23 continues. This first brake release takes place at a first constant rate which is predetermined and which may, for example, be of the order of 50 bath in the case of a hydraulic braking system, that is to say in the case of the example illustrated.

Still in sequence 23, the electronic unit 7 solves the following system of two simultaneous equations with two unknowns:

$$\begin{cases} a_{cons} = \dfrac{k_{s1} \times k_\mu \times D_1}{M_1 \times R} \\ V_{cons} = \dfrac{1}{2} \times \dfrac{k_{s1} \times k_\mu \times D_1^2}{M_1 \times R} \end{cases}, \qquad (2)$$

where $a_{cons}$ and $V_{cons}$ are a set acceleration and a set speed, while $k_{s1}$ and $D_1$ are the unknowns.

More specifically, $a_{cons}$ and $V_{cons}$ are predetermined speed and acceleration conditions that it is desired that the vehicle A attain under the action of its own weight. These predetermined speed and acceleration conditions are chosen both such that they cannot be attained without the driver of vehicle A noticing the abnormal rolling back of this vehicle and such that they are low enough to give this driver as much time as possible to react, that is to say in such a way as to minimize the risks of an accident occurring as a result of the unexpected rolling-back of the vehicle. For example, $a_{cons}$ and $V_{cons}$ may respectively be of the order of 1 m·s$^{-2}$ and of 0.2 m·s$^{-1}$.

$D_1$ is a duration. $k_{s1}$ is a rate of decrease, namely the constant rate at which the brakes 3 would need to be released from the pressure $P_1$ for the predetermined conditions $a_{cons}$ and $V_{cons}$ to be able to be attained at the end of the duration $D_1$, if the actual mass of the vehicle were the maximum mass $M_1$.

When the test 25 concludes that the actual pressure with which the brakes 3 are applied has reached the threshold pressure $P_1$ as estimated in step 24, the assist device 8 sets the rate of release of the brakes 3 to the value $k_{s1}$ and its electronic unit 7 starts to perform three further tests, which are the tests referenced 26, 27 and 28.

Figure 4:
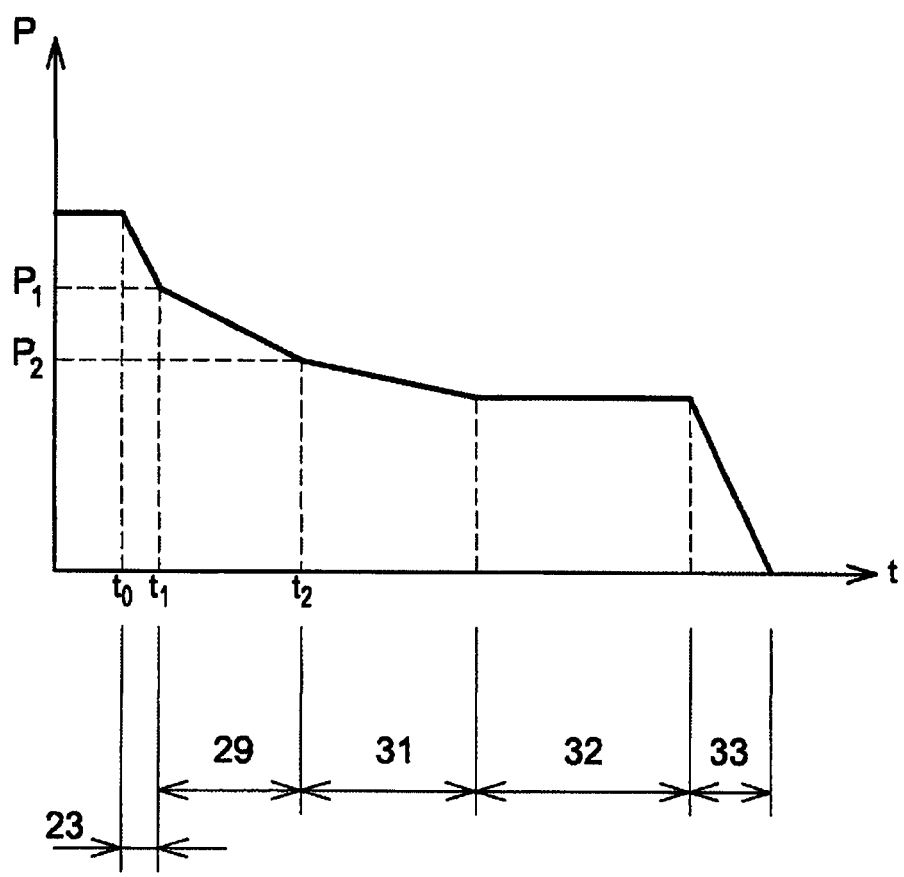
FIG. 4 is a graphical depiction of the change in pressure P with which the brakes of the vehicle of FIG. 2 are applied as a function of time t while the method, whose logic is depicted in FIG. 3, is being run.

After the change in the rate at which the brakes 3 are released there begins a second progressive and controlled release 29 of the brakes 3, from the instant denoted $t_1$ in FIG. 4. This second release 29 occurs linearly at the constant rate $k_{s1}$, that is to say in accordance with the following relationship:

$$P(t) = P_1 - k_{s1} \times (t - t_1) \qquad (3),$$

where t and P(t) or P are, respectively, the time and the pressure with which the brakes 3 are applied during this time t, the same origin or initial instant being chosen for t and $t_1$.

As may be seen from FIG. 4, $k_{s1}$ is lower than the first rate at which the brakes 3 are released in the sequence 23, this first rate being high so that the sequence 23 is as short as possible.

Test 26 consists in answering the question as to whether the vehicle A has started to move. If it has not, this test 26 is reiterated, while the release 29 at the predetermined second rate continues.

When test 26 concludes that the vehicle A has begun to move, a difference $\Delta M$ between the maximum mass $M_1$ and the actual mass of the vehicle A is estimated in a step 30 on the basis of the difference in time $\Delta t$ between the actual time and the estimated time that the vehicle A begins to move under the action of its own weight, that is to say between the moment of actual movement of the vehicle A and an instant calculated as being the instant at which this movement ought to have started if the mass of the vehicle A where the maximum mass $M_1$. The difference $\Delta M$ is estimated using the following relationship:

$$\Delta M = \frac{k_{s1} \times k_\mu \times \Delta t}{g \times \sin(\alpha) \times R}. \qquad (4)$$

On the basis of $\Delta M$, it is then easy to obtain an estimate $M_2$ of the actual mass of the vehicle A, given that $\Delta M = M_1 - M_2$.

Once $\Delta M$ and $M_2$ have been determined, the electronic unit 7 calculates a correction to the rate at which the brakes 3 are released, still in step 30, and thus determines a new constant rate $k_{s2}$ on release of these brakes 3 basing this on the estimate $M_2$ of the actual mass of the vehicle A.

More specifically, the electronic unit 7 determines the rate $k_{s2}$ as being one of the unknowns of a system of two simultaneous equations with two unknowns, by solving this system which is as follows:

$$\begin{cases} a_{cons} = \frac{\Delta M}{M_1} \times g \times \sin(\alpha) + \frac{k_{s2} \times k_\mu \times D_2}{M_1 \times R} \\ V_{cons} = \frac{\Delta M}{M_1} \times g \times \sin(\alpha) \times D_2 + \frac{1}{2} \times \frac{k_{s2} \times k_\mu \times D_2^2}{M_1 \times R} \end{cases} \quad (5)$$

where $D_2$ is the other unknown, namely the time taken to attain said predetermined conditions $a_{cons}$ and $V_{cons}$ from a second change in the rate of release of the brakes 3, that is to say a switch from the rate of decrease $k_{s1}$ to the rate of decrease $k_{s2}$.

In FIG. 4, the instant at which this second change in rate of release of the brakes 3 occurs is denoted $t_2$. At this instant $t_2$, the pressure with which the brakes 3 are applied has attained the value denoted $P_2$.

As soon as the rate of decrease $k_2$ has been determined, a third progressive and controlled release 31 of the brakes 3 begins from the instant $t_2$ onward, then the pressure P or P(t) with which these brakes 3 are applied decreases linearly according to the following relationship:

$$P(t)=P_2-k_{s2}\times(t-t_2) \quad (6),$$

where the same origin or initial instant is chosen for t and $t_2$.

In test 27, the electronic unit 7 checks whether or not the predetermined speed and acceleration conditions $a_{cons}$ and $V_{cons}$ have been attained. To do this, it performs a test on just one of these two conditions, namely on the set acceleration $a_{cons}$. As soon as this acceleration $a_{cons}$ has been attained, it is considered that both the speed and the acceleration conditions have been attained. These two conditions can also be considered to have been attained after each of them actually has been, whether this is simultaneously or at different moments in time.

When test 27 considers that the speed and acceleration conditions $a_{cons}$ and $V_{cons}$ have been attained, the electronic unit 7 interrupts the release of the brakes 3 for a second timed period, the predetermined duration of which is advantageously between 1 and 10 seconds. The fact that the pressure with which the brakes 3 are applied is kept 32 at a substantially constant level fixes the acceleration of the vehicle A moved by its own weight substantially at the value $a_{cons}$.

Whether in the direction of rolling back or in the opposite direction, the fact that the vehicle A starts to move alerts the driver to the fact that the parking brake has not been applied or has not been applied firmly enough. The driver can then react immediately by applying the parking brake while the speed of the vehicle A is still low, so that the risk of this vehicle A colliding with an obstacle remains very small.

When the second timed period has elapsed, the release of the brakes 3 is resumed, for example at a predetermined rate like the one employed in the first release of the brakes 3 in sequence 23, and this is what the reference 33 denotes.

In test 28, the electronic unit 7 checks whether or not the pressure with which the brakes 3 have been applied has reached the zero value. As long as the brakes 3 are subjected to a non-zero braking pressure, the test 28 is reiterated regularly. When the brakes 3 are no longer subjected to a braking pressure, the electronic unit 7 interrupts the method 20, the end of which is denoted by the reference 34.

The first release of the brakes 3 during the sequence 23 occurs rapidly because its rate is high. It stops before the vehicle A starts to move under the action of its own weight. Such movement of the vehicle A occurs while the brakes 3 are being released at the second rate of release $k_{s1}$, that is to say at a rate at which the motor vehicle generally tends towards the predetermined speed and acceleration conditions $a_{cons}$ and $V_{cons}$. The instant at which this movement occurs is used to correct the rate of release of the brakes 3, in the direction of more precisely tending towards predetermined speed and acceleration conditions $a_{cons}$ and $V_{cons}$.

At the same time as running the method 20 for progressively releasing the brakes 3, the electronic unit 7 regularly carries out a test 35 in which it checks whether a command to start the vehicle A is absent or present. This command may, for example, be the action of depressing the accelerator pedal of the vehicle A. As long as no command to start the vehicle A is detected, the test 35 is regularly reiterated with no further consequence. By contrast, if a starting of the vehicle A without rollback is detected following a command to start, the electronic unit 7 immediately interrupts the method 20 of progressively releasing the brakes 3 and replaces it by rapid release of the brakes so that the vehicle A is no longer held back as it starts to pull away.

The invention is not restricted to the embodiment described hereinabove. In particular, it is not restricted to the case of a hydraulic braking system. On the contrary, it also encompasses cases in which the braking system is of some other type, particularly the case of an electric braking system.

The invention claimed is:

1. A method of releasing brakes of a motor vehicle including a hill start assist device, the method comprising:
   a) if no command to start the vehicle occurs after a manual keeping of the brakes of the vehicle in a position that immobilizes the vehicle at a standstill ends, the assist device releases the brakes progressively according to a control designed to cause the vehicle to start to move under its own weight generally tending toward predetermined non-zero speed and acceleration conditions; then
   b) when the predetermined conditions are considered to have been reached, the assist device stops releasing the brakes; and
   if an assist-device applied brake pressure is progressively reduced to substantially zero then the assist device prematurely interrupts the method.

2. The method as claimed in claim 1, further comprising c) an operation which begins as soon as the manual keeping of the brakes in the position that immobilizes the vehicle ends and in which:
   during a predetermined time period on expiry of which operation a) begins, the assist device automatically keeps the brakes of the vehicle in the position that immobilizes the vehicle if no command to start the vehicle has occurred.

3. The method as claimed in claim 1, wherein, in operation a), the assist device performs the control using, as a mass of the vehicle, a predetermined mass and makes an estimate of an actual mass of the vehicle based on a difference in time between when the vehicle actually starts and when the vehicle was estimated to start to move under the action of its own weight, then the assist device performs the control using, as the mass of the vehicle, the estimate of the actual mass of the vehicle, the estimated start of movement of the motor vehicle being calculated on the basis of the predetermined mass.

4. The method as claimed in claim 1, wherein application of the brakes results from application of a braking pressure, and operation a) comprises at least one sequence in which:
   a1) a pressure with which the brakes are applied is dropped substantially linearly as a function of time at a rate of decrease substantially equal to $k_{s1}$, defined as forming part of a solution to a system of two simultaneous equations with two unknowns, which system is as follows:

$$\begin{cases} a_{cons} = \dfrac{k_{s1} \times k_\mu \times D_1}{M_1 \times R} \\ V_{cons} = \dfrac{1}{2} \times \dfrac{k_{s1} \times k_\mu \times D_1^2}{M_1 \times R} \end{cases},$$

wherein $a_{cons}$, $V_{cons}$, $k_\mu$, $M_1$ and $R$ are, respectively, an acceleration set as one of the predetermined conditions, a speed set as one of the predetermined conditions, a brake effectiveness coefficient, a mass of the motor vehicle, and a mean radius of wheels of the vehicle, while $k_{s1}$ is one of the unknowns and $D_1$ is the other unknown, of the time taken for the predetermined conditions to be reached measured from the start of the sequence a1).

5. The method as claimed in claim 4, wherein, in sequence a1), use is made, as the mass $M_1$ of the vehicle, of the predetermined mass, the operation a) comprising a sequence which follows the sequence a1) and in which:

a2) the pressure with which the brakes are applied is dropped substantially linearly as a function of time at a rate of decrease $k_{s2}$ defined as forming part of a solution to a system of two simultaneous equations with two unknowns, which system is as follows:

$$\begin{cases} a_{cons} = \dfrac{\Delta M}{M_1} \times g \times \sin(\alpha) + \dfrac{k_{s2} \times k_\mu \times D_2}{M_1 \times R} \\ V_{cons} = \dfrac{\Delta M}{M_1} \times g \times \sin(\alpha) \times D_2 + \dfrac{1}{2} \times \dfrac{k_{s2} \times k_\mu \times D_2^2}{M_1 \times R} \end{cases},$$

wherein $g$, $\alpha$, $M_2$ and $\Delta M$ are, respectively, acceleration due to gravity, an estimate of an angle of inclination of an anteroposterior axis of the motor vehicle with respect to the horizontal, the estimate of the actual mass of the vehicle and the difference between the predetermined mass $M_1$ and this estimate $M_2$ using the equation $\Delta M = M_1 - M_2$, while $k_{s2}$ is one of the unknowns and $D_2$ is the other unknown, of the time taken to reach the predetermined conditions measured from the start of sequence a2).

6. The method as claimed in claim 5, wherein, in operation a), the assist device makes the estimate $M_2$ of the actual mass of the vehicle using an equation which is as follows:

$$M_2 = M_1 - \dfrac{k_{s1} \times k_\mu \times \Delta t}{g \times \sin(\alpha) \times R},$$

wherein $M_2$ and $\Delta t$ are, respectively, the estimate of the actual mass of the vehicle and a difference in time between the actual and estimated times that the vehicle starts to move under action of its own weight.

7. The method as claimed in claim 4, wherein the operation a) comprises a sequence a2) that the sequence a1) follows and in which:

a2) the assist device releases the brakes at a predetermined rate.

8. The method as claimed in claim 7, wherein, before the sequence a1), the assist device evaluates a minimum braking pressure below which the pressure with which the brakes are applied is insufficient for the brakes to succeed in keeping the vehicle immobilized against the weight of the vehicle, and the assist device switches from the sequence a2) to the sequence a1) when the pressure with which the brakes are applied reaches a threshold evaluated on the basis of the minimum braking pressure.

9. The method as claimed in claim 1, wherein the assist device regularly checks at least one item of information relating to detection of the possible command to start the vehicle, throughout the brake release method, and prematurely interrupts the method if the command to start the vehicle is detected.

10. The method as claimed in claim 5, wherein the operation comprises a sequence a3) that follows the sequence a2) and in which:

a3) the assist device releases the brakes at a predetermined rate.

11. A hill start assist device for a motor vehicle, configured to perform progressive release of brakes of the motor vehicle if no command to start the vehicle occurs after a manual keeping of the brakes of the vehicle in a position that immobilizes the vehicle at a standstill ends, the progressive release of the brakes taking place according to a control configured to cause the vehicle to start to move under its own weight generally tending toward predetermined non-zero speed and acceleration conditions, the assist device being configured to halt the release of the brakes when the predetermined conditions are considered to have been reached, wherein if an assist-device applied brake pressure is progressively reduced to substantially zero then the assist device prematurely interrupts the method.

12. An assist device, configured to implement the method as claimed in claim 1.

13. A motor vehicle, comprising the assist device as claimed in claim 11.

* * * * *